United States Patent [19]

Sakai et al.

[11] Patent Number: 5,737,688
[45] Date of Patent: Apr. 7, 1998

[54] RADIO-PAGER AND METHOD OF RADIO-PAGING

[75] Inventors: Yoichi Sakai, Hachioji; Fukuya Ishino, Yokohama, both of Japan

[73] Assignees: Sharp Kabushiki Kaisha, Osaka; NTT Software Corporation, Kanagawa, both of Japan

[21] Appl. No.: 397,937

[22] Filed: Mar. 3, 1995

[30] Foreign Application Priority Data

Mar. 4, 1994 [JP] Japan ................... 6-034811

[51] Int. Cl.$^6$ ............... H04Q 7/06; H04Q 7/10
[52] U.S. Cl. .......... 455/31.2; 455/426; 455/458; 340/825.44
[58] Field of Search ............... 379/56, 57, 127; 455/38.1, 38.2, 38.4, 38.5, 31.2, 426, 458; 340/825.44, 825.47

[56] References Cited

U.S. PATENT DOCUMENTS 5,473,667 12/1995 Neustein ................... 379/57
5,583,921 12/1996 Hidaka ................... 379/57 X

FOREIGN PATENT DOCUMENTS 3-187627 8/1991 Japan.
4-27739 5/1992 Japan.

OTHER PUBLICATIONS

"Integrated and Varied Pocket Bells", Wada, Technical Journal of NTT, pp. 27–35, Apr. 1989.

Primary Examiner—Dwayne Bost
Assistant Examiner—Nay Maung

[57] ABSTRACT

The purpose of the invention is to provide a radio-pager that allows a user to set any desired call-sign therein and method of radio-paging that not only conducts person-to-person communication but easily realizes transmission from one person to a plurality (N) of persons such as simultaneous transmission of the same message or commercial massage to a number of pagers. The pager receives radio waves by an antenna, demodulates the received signal into digital data by a radio demodulator and transfers the data to a digital circuit that corrects the data for code transmission error caused by affection of fading. A CPU of the pager examines the correctly reproduced data and extracts a call-sign from the data stream. The CPU 25 reads a call-sign stored in a RAM and examines whether the extracted call-sign corrsponds to the stored call-sign. The pager drives an electronic speaker when the CPU detects that both call-signs are identiacal with each other.

15 Claims, 6 Drawing Sheets

RADIO-PAGER AND METHOD OF RADIO-PAGING

BACKGROUND OF THE INVENTION

1. Field of the Invention

The present invention relates to a radio-pager and method of radio-paging and more particularly to a radio-pager of the type which allows a user to optionally set a desired call-sign therein and method of radio-paging which easily realizes not only person-to-person communication but simultaneous transmission of the same message and a commercial message from one sending party to a plurality (N) of users each having a plurality of desired call-signs set in his pager.

2. Description of the Background Art

In any conventional paging system, a communication service provider normally gives to every pager one or two specified call-signs for identification, which are written in a read-only memory (hereinafter referred to as ROM) of the pager by using an operator's special writing unit. When a pager received its own call-sign it checks whether the call-sign corresponds to the stored one or not. If the call-sign matches with the stored one, the pager produces an electronic sound or indicates a received alphanumeric message on its display screen. This method is effective to prevent allocation of the same call-sign to a plurality of pagers (to assure paging a specified individual) and to prevent any one from writing other person's call-sign in his pager with an intention to use paging services without paying charges or listen in the person's communication. Conventional pagers are disclosed in the published reference "integrated and varied pocket bells" (WADA, technical journal of NTT, pp27-35, April 1989). A typical radio-pager described in the reference is intended to receive a selectively calling signal transmitted from a local radio-paging station. The pager comprises a control portion for comparing a detected signal with a pager number written in a ROM and a sound-and-light driving portion for driving a speaker and a LED (light emitting diode). When the pager receives the selectively calling signal, it produces a combination of sound and flickering light signals. The pager can display characters (Chinese characters, Japanese syllabaries, Alphabetical characters) and graphics on the LED display. A message can be prepared by using telephone set with tone (DTHF) dioler (push-phone) as a massage input terminal.

The above-mentioned paging method, however, has the following drawbacks:

For instance, every user who desires to use paging services must buy a pager, visits an office of a communication service provider and makes a contract with the provider to assign a number to the pager. Generally, one who bought a pager (hereinafter referred to as "receiving person") pays a monthly charge to the communication service provider. This means that the receiving person must pay a constant charge even if he seldom used paging service. Furthermore, when a calling person (hereinafter referred to as "caller") wants to simultaneously page a number of specified receiving persons or send the same message to a number of specified receiving persons, he must make a number of calling operations corresponding to the number of persons to be paged because their pagers have different call-signs. This requires much time and many charges. The Japanese laid-open patent publication No. 3-187627 describes a pager that has a function to convert an externally inputted service number into an address. However, this pager has a given call-sign that is preset in its memory. The user can only input a command for deciding to use or not to use the given call-sign. He can not set any optional call-sign in his pager On the contrary, a pager according to the present invention has no given call-sign and allows a user to select any desired number as its call-sign and to enter said number into the pager's memory. Application of pagers according to the present invention makes it possible to create such a system that provides paging services without contracting with a paging service a provider.

Japanese patent publication No. 4-27739 describes a pager that has a function to externally input a code to instruct displaying an information at a terminal. The user can only input a command for deciding to use or not to use the given call-sign However, he can not set any optional call-sign in his pager.

On the contrary, a pager according to the present invention has no given call-sign and allows a user to select any desired number as its call-sign and to enter said number into the pager's memory. Application of pagers according to the present invention makes it possible to create such a system that provides paging services without contracting with a paging service provider.

SUMMARY OF THE INVENTION

It is a object of the present invention to provide a radio-pager and a method of radio-paging that allows every user to use radio-paging services by only purchasing a pager without contracting with a service provider for allocating a specified call-sign to the pager, enables a calling person to simultaneously page all pagers defined as of the same group by one calling operation when he desires to page many persons at the same time or send the same message to them at the same time, makes it possible to force every pager to receive a paging signal or message, permits only designated parties to transmit information to a number of pagers, enables the paging system provider to collect service fees from calling parties at every time of using the paging services without making monthly contracts with them.

It is another object of the present invention to provide a radio-paging system in which radio-paging services can be conducted without contracting with a radio-paging control center by allowing every user to set any desired call-sign in his pager and by collecting service fees from calling parties every time of using the service; multi-address paging service for simultaneously calling all members of the same group can be provided besides person-to-person paging by allowing users to preset a plurality of call-signs (personal and group) in their pagers; protection against malicious use of commercial paging code for transmission to many users is achieved by using passwords for identifying calling parties; all users of pagers can be forcibly informed of necessary information by manufacturing pagers designed to keep certain preset call-signs that can not be erased by users.

In a conventional system of contracted paging service each pager is given a specially designated calling-sign that is written into a read only memory (ROM) by a paging service provider when it is registered in a paging service system. Since the call-sign is unique for the subscriber (pager) and differs from all other subscribers (pagers) and can not be rewritten by the user, the conventional paging system can be protected against using of the service without paying paging fees and radio-tapping.

On the other hand, a paging service system according to the present invention uses pagers each having a random access memory (RAM) in which a user can write a desired call-sign by using a symbol-numeric keyboard and which has a capacity of storing a plurality of call-signs. When a pager receives a transmitted calling signal, it identifies the signal with any one of call-signs stored therein and generates an electronic sound and indicates a message (a number and characters on its display screen.

To achieve the above-mentioned objects, the present invention provides:

(1) a pager (radio-paging receiver) for producing electronic sound or for displaying a message including a number and/or characters and/or a picture received together with the call-sign or for both producing the electronic sound and displaying the message, when detecting its own call-sign transmitted by a radio wave, which comprises demodulating means to receive a modulated radio wave and extract digital information therefrom; storing means to store its own call-sign; identifying means to check whether the received call-sign is identical with the stored call-sign; sounding means to produce an electronic sound when both call signs having been identified with each other; displaying means to display a message including a number and/or characters and/or a picture transmitted after the call-sign, and inputting means to input the call-sign into the storing means, whereby it allows a user to set any optional call-sign in the storing means;

(2) a pager that can further memorize a plurality of call-signs and produce electronic sound or display a message including a number and/or characters and/or a picture or doing both the above-mentioned functions when the received call-sign is identical with any one of the stored call-signs;

(3) a pager as defined in any of items (1) and (2) characterized in that a group of specified call-signs can not be inputted by the user;

(4) a pager as defined in any of items (1) through (3), characterized in that a specified call-sign or a group of specially classified call-signs preset before it is sold can not be reset (erased) by the user;

(5) a method of a radio-paging whereby a radio-paging center for receiving signals for calling pagers defined above in items (1), (2), (3) and (4) over a telephone network and transmitting the signals to a radio-transmitting station can be so controlled that a specified call-sign or a group of specified call-signs may not be accepted to transmit; and (6) a method of a radio-paging for calling the pagers defined above in items (1), (2), (3) and (4), which enables a telephone-network service provider to collect by proxy radio-paging service fees in addition to telephone call fees from calling parties at each time of using the paging services.

PREFERRED EMBODIMENTS OF THE INVENTION

Figure 1:
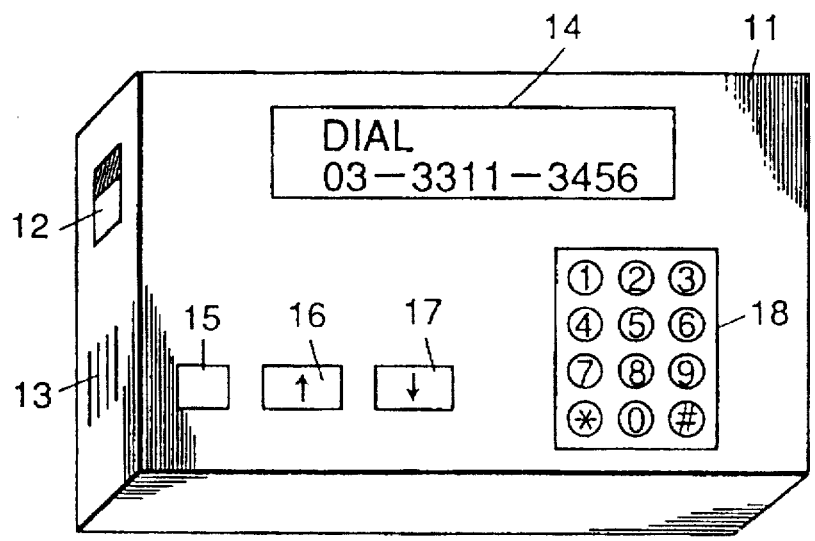
FIG. 1 is an external view of a pager (radio-paging receiver) capable of optionally setting its own call-sign which is an embodiment of the present invention.

Referring now to the accompanying drawings, preferred embodiments of the present invention will be described in detail as follows:

FIG. 1 is a construction view for explaining a radio-paging receiver (hereinafter referred to as "pager") embodying the present invention, which allows a user to set any desired call-sign therein. In FIG. 1, there is shown a pager 11 that has a power switch 12, a speaker 13, a display 14, set button 15, a scroll-up button 16, a scroll-down button 17 and symbol-numeric keyboard 18.

The power switch 12 is used to turn on and off the power of the pager. It is also used to select the sound mode or silent mode. The speaker 13 generates an electronic sound and the display 14 indicates a received message (a number and characters). The set button 15 is used for selecting the pager control mode. The scroll buttons 16 and 17 are used for rolling up and down numerals and characters indicated on the display screen. The symbol-numeric keyboard 18 is used for entering a number and symbols comprising a call-sign of the pager. (A conventional pager has no keyboard since its call-sign is inputted by a page service provider.)

When using the symbol-numeric keyboard 18, it is necessary to press the set button 15 (e.g., for more than 4 seconds) until an indication "Call-sign (ID) can be set" appears on a screen of the display 14. A number and symbols of a call-sign are set by using the symbol-numeric keyboard 18 and then the set button 15 is pressed again to return the pager into waiting mode.

At this time, it is possible to set in the pager three kinds of call-signs: a personal call-sign, a group call-sign and a commercial call-sign.

The personal call-sign is used for person-to-person paging. It is preferable to select a unique number, e.g., user's own telephone number of 9–10 figures. (with a leftmost digit of 0).

The group call-sign is used for paging from one person to all members of the same group. It is desired to select a number that is different from the personal call-signs (for example, a number of 10 figures with a left most digit other than 0).

The commercial call-sign is used for sending a commercial message of a specified company to many users. An easily remembered short number (e.g., of 4 figures) is desirable.

With a purchased pager, the user presets therein his own telephone number as its personal call-sign, a predetermined call-sign of a group to which the user belongs and a commercial call-sign of any desired company He has to register a password number of a mail box (to be described later) together with the personal call-sign number in a radio-paging control center.

Figure 2:
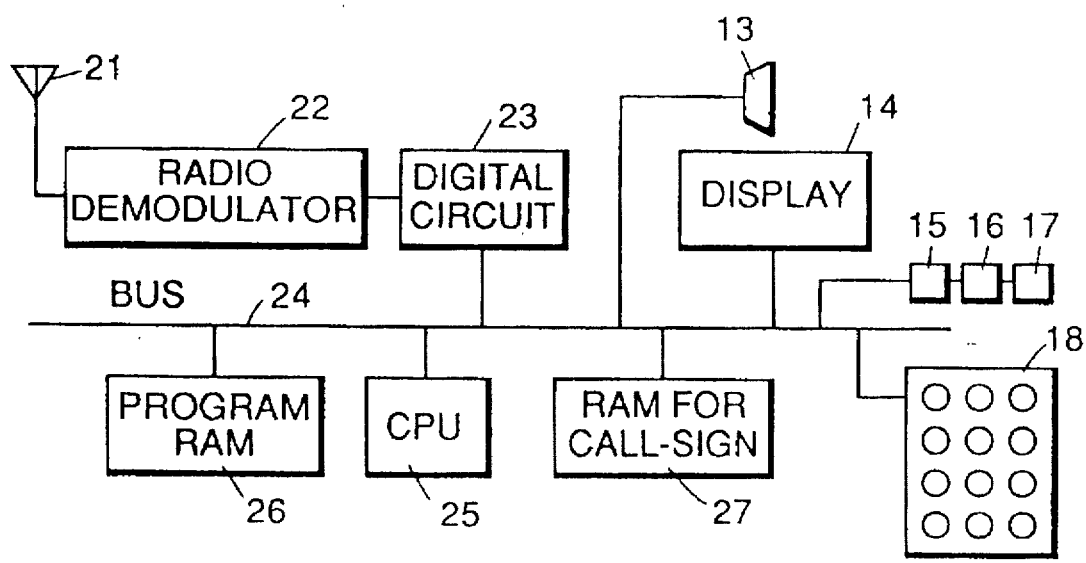
FIG. 2 is a block diagram for explaining a pager capable of optionally setting its call-sign, which is an embodiment of the present invention.

FIG. 2 is a block-diagram of a pager according to the present invention, which allows setting optional call-signs (ID numbers). In FIG. 2, there is shown an antenna 21, a radio demodulator 22, a digital circuit 23, an internal bus 24, a CPU (central processing unit) 25, a program RAM (random access memory) 26 and a call-sign RAM 27. The other portions similar in function to those shown in FIG. 1 are given the same reference numbers.

The CPU 25 controls all portions of the pager. The program RAM 2C stores programs and data and the call-sign RAM 27 stores call-signs.

The pager receives radio waves by the antenna 21 and converts the waves into digital data by the demodulator 22. The digital data is then transferred to the digital circuit 23 wherein the data are corrected for digital transmission error caused by fading. The CPU 25 examines the correctly restored data, extracts a call-sign from the data stream and compares the extracted call-sign with the call-sign read from the call-sign storing RAM 27 to determine whether the extracted call-sign is identical with the stored one or not. If the call-sign differs from the stored one, the pager does nothing and waits until arrival of a next call-sign. When the CPU recognizes that the received call-sign is identical with the stored one, it drives the speaker 13 to generate an electronic sound and, at the same time, receives an alpha-numeric message coming after the call-sign and outputs it on the display 14.

Figure 3:
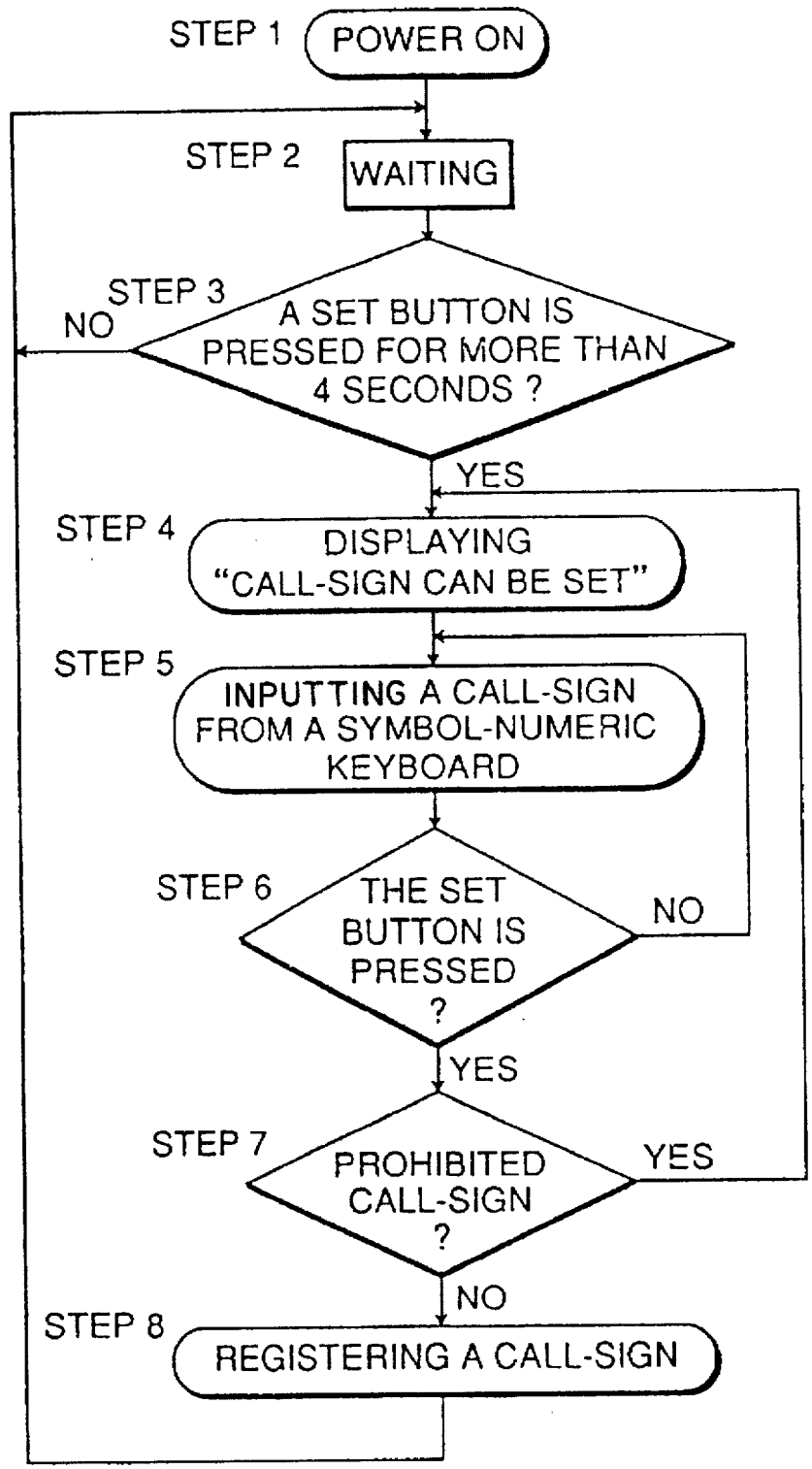
FIG. 3 is a flow chart for inputting a call-sign into a pager according to the present invention.

FIG. 3 is a flow chart for inputting a call-sign into a pager. The operation steps are as follows: With a pager in waiting state (STEP2), the user presses the set button 15 for more than 4 seconds (STEP3) until the pager turns into ID setting mode and the display 14 indicates a message "Call-sign (ID) can be set" (STEP4). In the ID setting mode, the user enters a call-sign (ID) from the symbol-numeric keyboard 18 into the pager (STEP5) and presses the set button (STEP6). The CPU 25 of the pager examines whether the entered call-sign corresponds to a specified group of call-signs prohibited from being inputted into or erased from the RAM of the pager STEP7). If the entered call-sign corresponds to a prohibited one, operation returns to STEP4. When the entered call-sign does not correspond to a prohibited one, the CPU 25 completes registration of the call-sign in the RAM of the pager (STEP8) and the pager returns into the waiting mode. A plurality of call-signs can be entered into the pager by repeating the above-mentioned steps.

Figure 4:
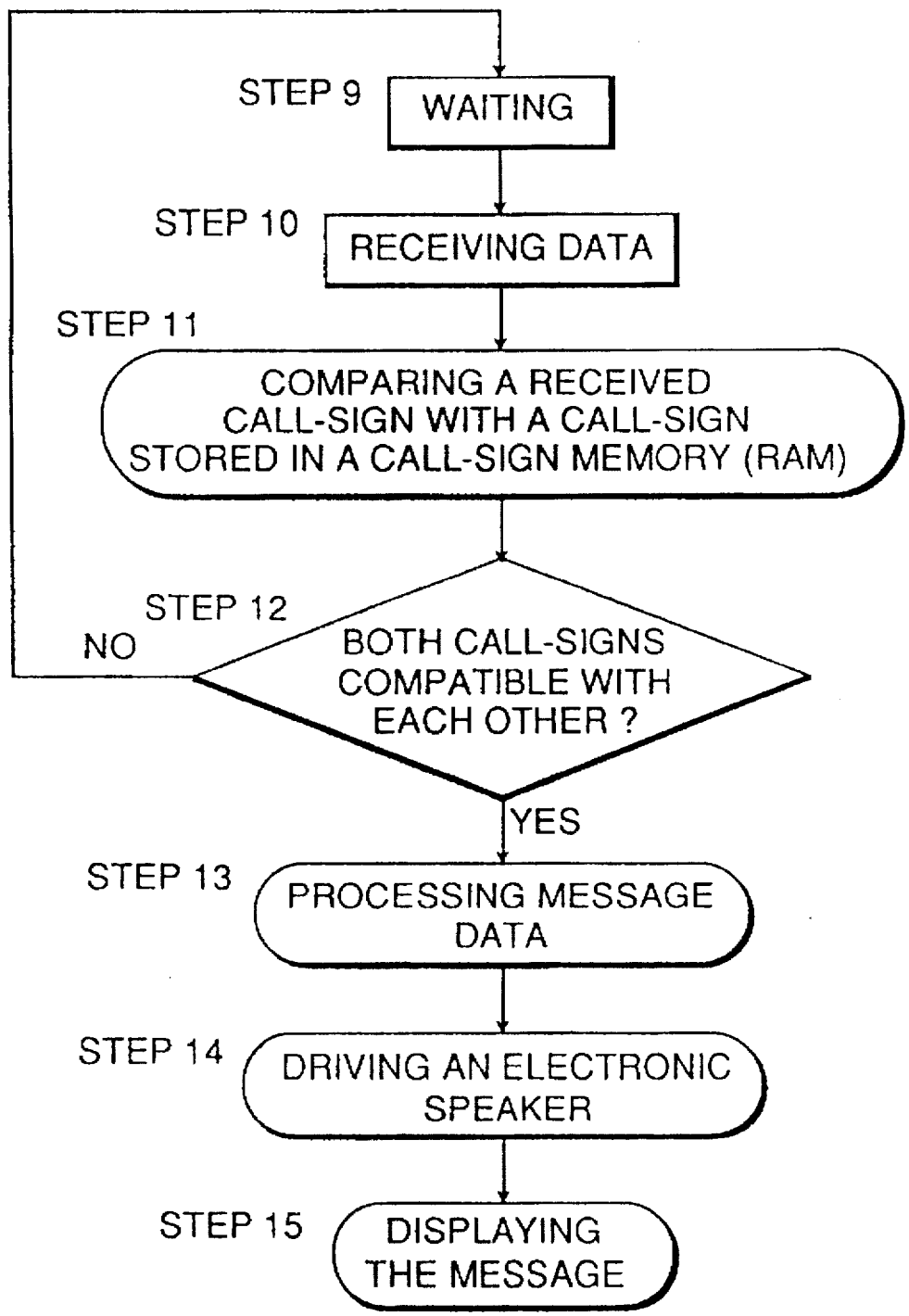
FIG. 4 is a flow chart for explaining operations of a pager according to the present invention when it receives data.

FIG. 4 is a flow chart for explaining the operation of the pager when it receives data. The operation steps are as follows:

When the pager in the waiting state (STEP9) and then receives the data in (STEP10), it extracts a call-sign from the received data and examines whether the extracted call-sign is identical with any one of the call-signs stored in the call-sign RAM 27 (STEP11, STEP12). If the same call-sign can not be found in the RAM, the pager returns into the waiting mode (STEP9). When the extracted call-sign corresponds to any one of the stored call-signs, the pager conducts processing of the message data (STEP13), drives the electronic speaker (STEP14) and displays the message (number, characters and picture) on the display screen 14 (STEP15).

Figure 5:
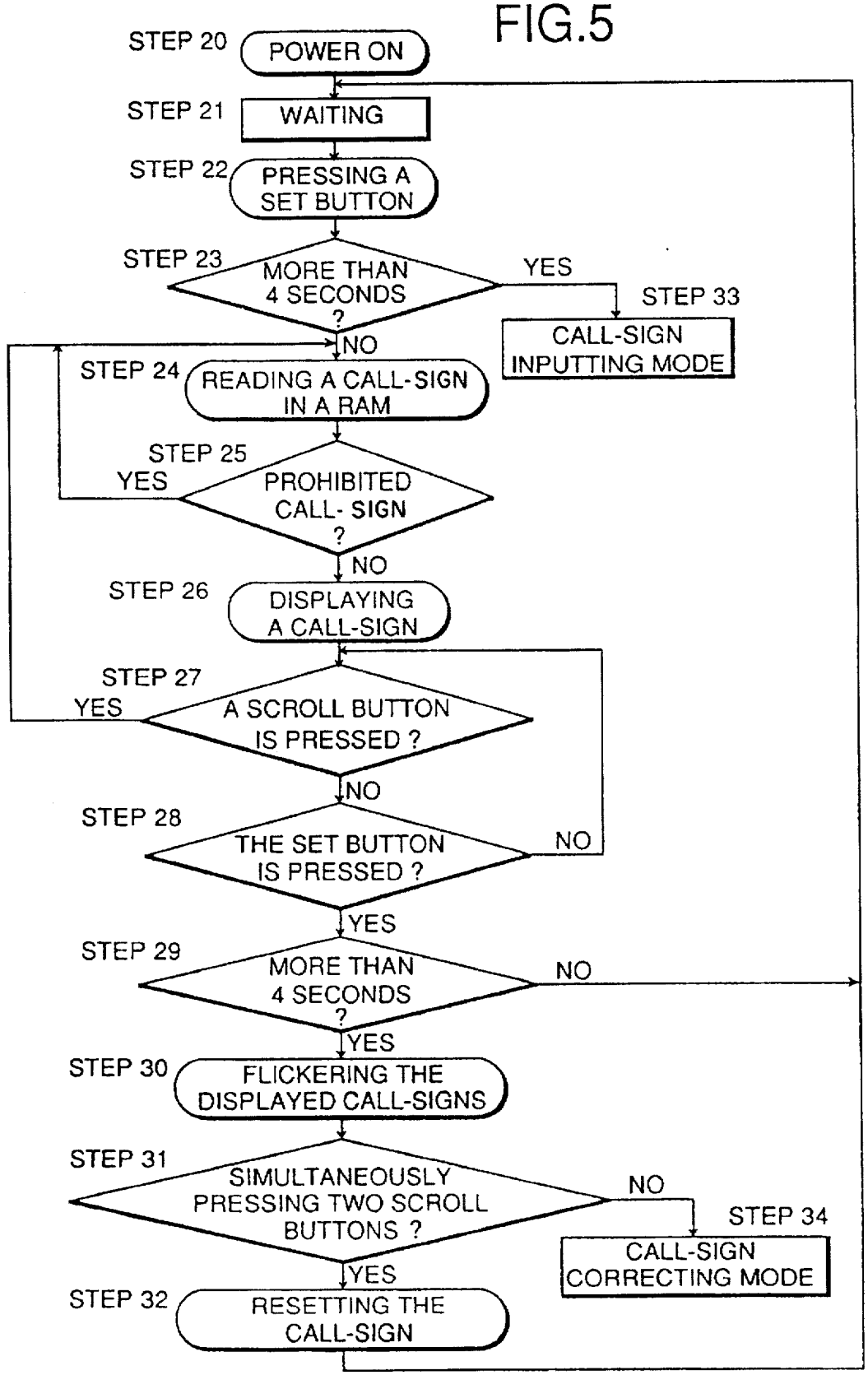
FIG. 5 is a flow chart for resetting a call-sign stored in a pager according to the present invention.

FIG. 5 is a flow chart for resetting (erasing) a call-sign inputted into a pager. The operation steps are as follows:

With the pager in the waiting state (STEP21), the user presses the set button 15 (STEP23). A call-sign is read out from the call-sign RAM (STEP24). At STEP23, if the set button 15 is pressed for more than 4 seconds, the pager is turned into the input mode (STEP33) and its operation will be perfomed according to the flow chart of FIG. 3. The pager examines whether the call-sign read out from the RAM 27 corresponds to a prohibited one or not (STEP25). If the call-sign is identical with a prohibited one, the pager reads out a next call-sign from the RAM 27. If the call-sign is not prohibited, it will be indicated on the display screen 14 (STEP26).

If the user presses the scroll button 16 or 17 at STEP26, the operation returns to STEP24 and a next call-sign will be read out from the RAM 27. The user presses the set button 15 for 4 seconds or more (STEP28, STEP29) until the indicated call-sign starts to flicker (STEP30). If the set button 15 is pressed for a short time (less than 4 seconds), the pager returns into the waiting mode (STEP21). While the indicated call-sign flickers (STEP30), the user can correct the call-sign by manipulating the symbol-numeric keyboard 18 (STEPS4). At STEP30, the user presses both scroll buttons 16 and 17 at the same time (STEP31), whereby the indicated call-sign is reset (erased) (STEP32) and the pager returns into the waiting mode (STEP21).

Figure 6:
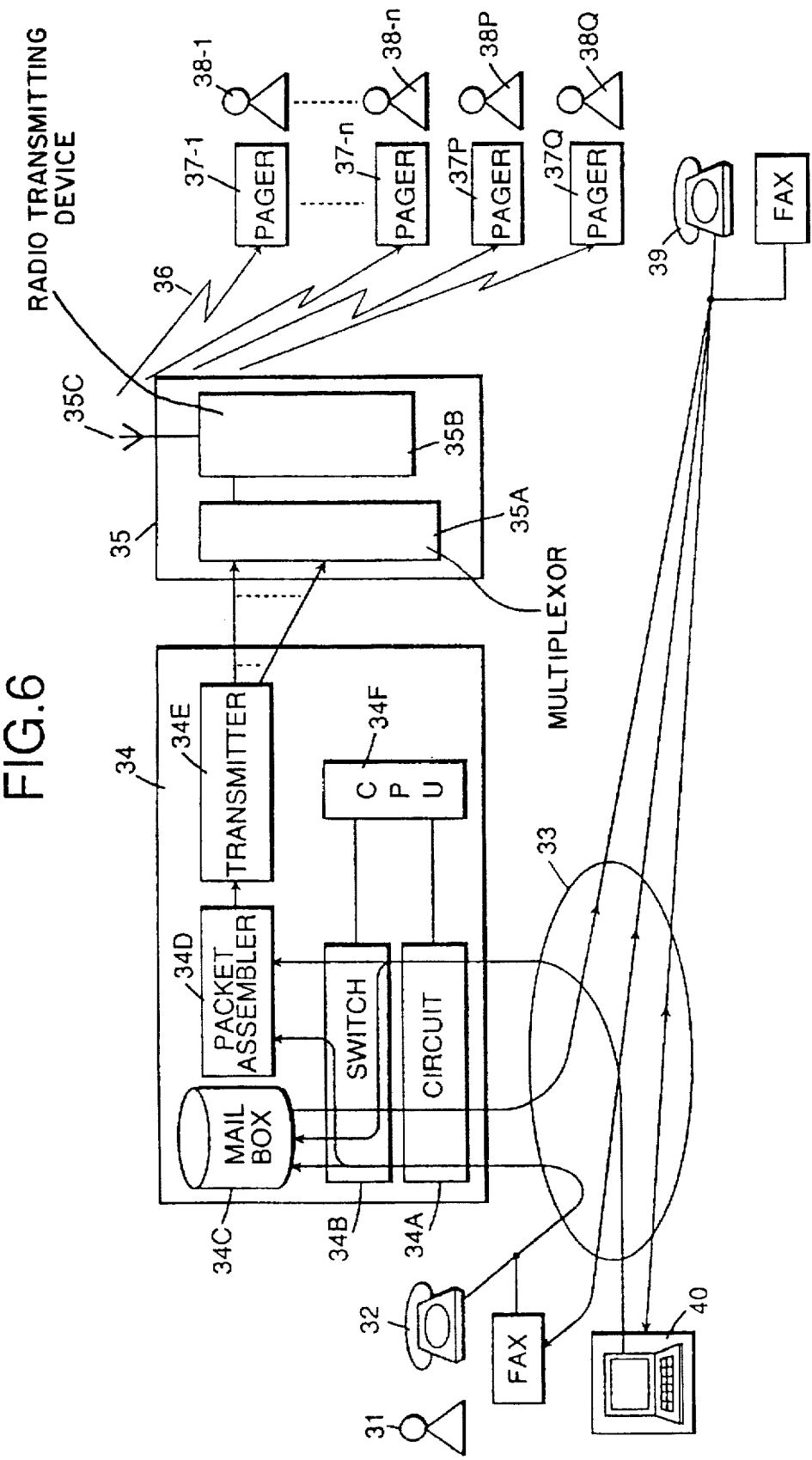
FIG. 6 is a construction view of a network for explaining a radio-paging method according to the present invention.

FIG. 6 is a construction view of a network for explaining how a radio-paging service is conducted. In FIG. 6, there is shown the radio-paging service system including a user (sending party) 31; a telephone or facsimile 32; a telephone network 33; a radio-paging control center 34 which comprises a circuit portion 34A, a switch 34B, a mail box 34C, a packet assembler 34D, a transmitter 34E and a CPU (central processing unit) 34F; a radio transmitting station 35 which comprises a multiplexor 35A, a radio transmitter 35B, transmitting antenna 35C and a radio-station power source 36; pagers 37-1 to 37-n, 37P and 37Q; users who purchased the pagers (receiving parties) 38-1 to 38-n, 38P and 38Q; a telephone or facsimile 39: and an information provider 40.

The user 31 is a caller who wants to transmit a paging information. The telephone and the facsimile 32 are used by the caller 31. The radio-paging control center 34 is a paging business center wherein a circuit portion 34A receives data (call-sign plus message by number and/or characters and/or voice and/or facsimile) from the caller 31, the switch 34B distributes the data, the mail box 34C stores the voice or facsimile message, the packet assembler 34D assembles a block of data to be transmitted by the transmitter 34E and the CPU 34F controls service functions. The multiplexor 35A of the radio transmitting station 35 multiplexes signals received from a plurality of the radio-paging control centers 34. The telephone 39 or the facsimile 39 are used by the user (receiving party) to access the sending party. The information provider 40 is a business company that supplies various kinds of commercial information.

Figure 7:
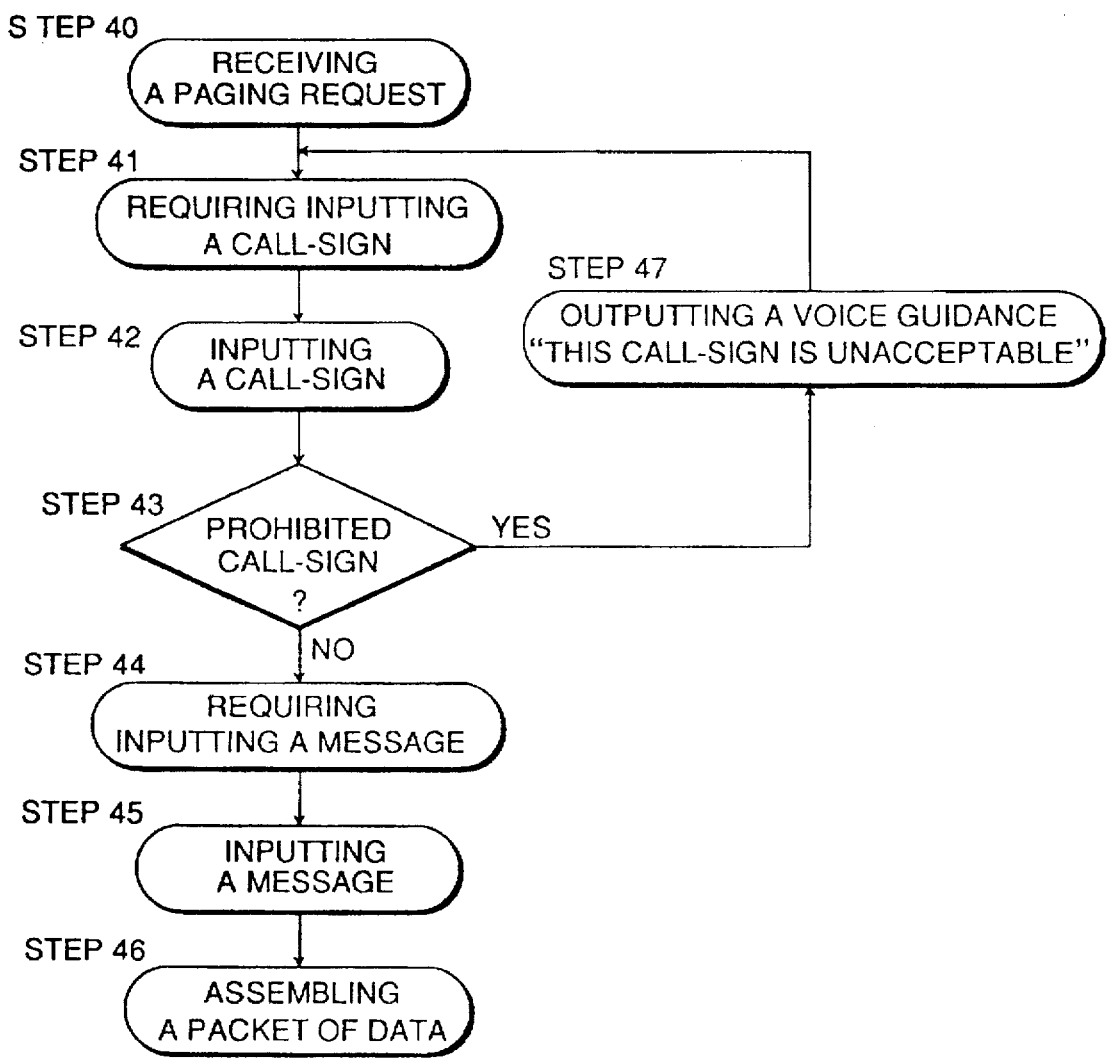
FIG. 7 is a flow chart for radio-paging control not to accept transmission of a specified call-sign by a method according to the present invention.

FIG. 7 is a flow chart for depicting a sequence of control operations not to accept transmission of specified call-signs. The steps are described as follows:

A person 31 who wants to transmit makes an access to the CPU 34F of the radio-paging control station 34 over the telephone network 33 by means of the telephone 32. At this time, the CPU 34F is in the paging service reception mode (STEP40) and requires the caller 31 to input a call-sign to be transmitted (STEP41). The caller 31 inputs a call-sign by DTMF (dual tone multi-frequency signals of the telephone 32. The inputted call-sign is transmitted over the telephone network 33 to the CPU 34F (STEP42).

The CPU 34F examines whether the inputted call-sign (STEP42) corresponds to any of prohibited call-signs or not (STEP43). If the call-sign is the prohibited one, the CPU 34F informs the caller that said call-sign is prohibited from being transmitted (STEP47), and it requires the caller 31 to enter another call-sign (STEP41). When the call-sign is not prohibited, the CPU 34F requires the caller 31 to enter a message (STEP44). The caller 31 inputs the message by DTMF (STEP45). The inputted call-sign and message are assembled into a packet by the packet assembler 34D and transferred through the transmitter 34E and the multiplexor 35A to the radio transmitting device 35B whereby the packetized data are transmitted by a radio wave.

In the telephone network 33, it is possible for a telephone communication provider on behalf of a paging service provider to collect a paging service fee in addition to a telephone charge from the caller 31 at each time of using the paging service. The charge collecting services have been realized in Japan by NTT (Nippon Telegraph and Terephone Corporation), for example, for information providers in the system called "Dial Q2." The paging service fees can be collected from a caller (not charging receiving persons) by utilizing said service of NTT (Nippon Telegraph and Terephone Corporation).

Referring to the flow chart of FIG. 3, a method of realizing radio-paging services using the pagers according to the present invention (in comparison with a conventional method) will be described as follows:

In conventional radio-paging services, the users 38-1 to 38Q purchase their own pagers 37-1 to 37Q and require the radio-paging control center 34 or its agent to assign and write respective call-signs in the respective pagers, and, at the same time, they pay a monthly charge for paging service to the radio-paging control center 34. A caller 31 who wants to use the radio-paging service sends a call-sign of a person to be paged and a message (number and/or characters and/or a picture) by DTMF signals of his telephone over the telephone network 33 to the radio-paging control center 34, wherein the data received by the circuit 34A are distributed by the switch 34B and assembled into a packet by the packet assembler 34D, then the packetized data are transferred through the transmitter 34E to the radio transmitting station 35.

In view of the event that the paged person can not soon make a call back, the caller 31 may leave a detailed message in the voice mail box and/or the facsimile mail box 34C. The radio-transmitting station 35 transmits radio waves 36 carrying the multiplexed call-sign and the message (number and/or characters and/or a picture). All pagers 37-1 through 37Q receive the radio wave and may generate electronic sound and indicate the message on the display screen 14 for informing of the sender's will if the call-sign is identical with the call-signs stored in their pagers. The person 37-1, if his pager sounds, reads the sender's name and telephone number from the indicated message and dials the caller 31 to hear the business or he knows a mail and a mail box number by the indicated message and makes an access to the voice or facsimile mail box 34C by using a telephone or facsimile over the telephone network to receive the detailed information left therein by the caller 31.

The radio-paging service system according to the present invention allows the callee to set their personal call-signs in their own pagers and to be paged from a caller through the radio-paging control center 34 without subscription contract if the sender is previously informed of their call-signs. This method, however, also allows any one to set in his pager the same call number of another person's pager with intention of tapping. Namely, the proposed system premises that each paging action and message (number and/or characters and/or a picture) transmitted by radio waves may be known by an unrelated person. The confidential or private information, therefore, must be informed to the paged person when he dials the caller, or such information must be stored in the voice and facsimile mail box 34C and protected by registering a password for accessing thereto.

The present invention provides that receiving users do not pay monthly charges for paging services and radio-paging service charges and mail storing charges besides normal telephone charges are collected by the proxy (NTT (Nippon Telegraph and Telephone Corporation) service named "Dial Q2") from sending users and receiving users every time when they dial the radio-paging control center 34. This allows callee to use the paging service without a subscription contract. Each caller pays the paging-service charge at each time of using the service. Since charge for one time service is surely smaller than the conventional monthly charge, the invented method may save the monthly expenses for those who do not frequently use the paging services.

The invented method offers the following features: All members belonging to the same group may write a call number of the group besides their personal call-sign in their own pagers and, thereby, all members can be simultaneously given the same information by one paging. If the callees 38-1 through 38-n are members of a specified group and keep a call number of the group in their pagers, they may be easily at the same time informed of, for example, whether the athletic meeting is held today or postponed, lecture is given or not, or there is something to be recycled.

Furthermore, the present method enables the information providers 40 to supply the receiving persons (customers) with a commercial message at the same time by sending a commercial call-sign, a short message and its voice or facsimile mail-box number to the pagers through the radio-paging control center. This feature is similar in function with the fore-described group paging and makes it possible for the company 40 to transmit commercial information to the only interested persons by using one paging at a small expense. For instance, it is possible for a supermarket to supply the local receiving consumers with a bargain-sale information by using a specified commercial call-sign. A real-time information of stock-prices is also transmitted through the radio-paging service. It is also possible to force all pager owners in a district to know an important information such as a tidal wave warning, a more safe place of refuge in the event of an earthquake and so on. It is effective to manufacture all pagers designed to keep therein an non-erasable call-sign used for forcible transmission of the above-mentioned kind of information.

There is a fear of dishonest or mischievous use of the commercial paging services if every person is permitted to use said services. To avoid this, a password number is used for identification of the information provider 40 when said provider transmits an information to the radio-paging control center 34 that in turn accepts the transmission of the message to the pagers after confirmation of the password predetermined between the both parties.

As described above, the main features of the present invention are such that every pager to be used has a RAM (not a ROM) permitting writing of a desired personal call-sign freely therein in contrast to a conventional pager having a ROM for non-erasably storing a call-sign specified and written by a paging-service provider; the pager keeps a plurality of call-signs inputted by the owner into the RAM and can generate a sound signal and/or indicate a message (number and/or characters and/or a picture) on its display screen when it recognizes that a received call-sign corresponds to any of the stored call-signs; the pager, however, does not allow any user to erase (reset) a specified call-sign or a group of specially classified call-signs preset in advance; every user can buy and use the pager without entering into a monthly payment contract with the radio-paging control center; and each information-caller or company pays a charge at each time of using the paging service and the service charge is collected by utilizing the charge collecting service provided by the telephone-network service provider.

As many apparently widely different embodiments of this invention may be made without departing from the spirit and scope thereof, it is to be understood that the invention is not limited to the specific embodiments thereof except as defined in the appended claims.

We claim:

1. A radio-pager having an identification code, the radio-pager producing an electronic sound signal, displaying a message including a number, characters or a picture received together with an identification code, or simultaneously producing the electronic sound and displaying the message upon detecting that the received identification code corresponds to the identification code of the radio-pager, the radio-pager comprising:

demodulating means for receiving a modulated radio wave and extracting digital information including the message and the received identification code therefrom;

storing means for storing the identification code of the radio-pager;

identifying means for checking whether the extracted received identification code is identical with the stored identification code;

sounding means for producing the electronic sound when the stored identification code and the extracted received identification code have been identified as identical to each other;

displaying means for displaying the extracted message which is transmitted after the received identification code; and inputting means for inputting the identification code of the radio-pager into said storing means to set any user inputted optional identification code in said storing means as the identification code of the radio-pager.

2. The radio-pager as defined in claim 1, said storing means storing a plurality of identification codes as identification codes of the radio-pager, said sounding means producing the electronic sound, said displaying means displaying the message or said sounding means producing the sound simultaneously as said displaying means displays the message when the extracted received identification code is identical with any one of the plurality of stored identification codes.

3. The radio-pager as defined in any one of claims 1 and 2, wherein not every user is allowed to input a specified group of identification codes into said storing means.

4. The radio-pager as defined in any one of claims 1 and 2, wherein not every user is allowed to erase a specified identification code or a group of specially classified identification codes inputted into said storing means before the radio-pager is sold.

5. The radio-pager of claim 1, wherein said input means comprises a symbol-numeric keyboard mounted on the radio-pager.

6. A radio-paging system comprising:

a radio-pager for producing an electronic sound and displaying a received message, the received message including numbers, characters and a picture received together with a an identification code, said radio-pager comprising input means for selecting a designated identification code for said radio-pager, storage means for storing the designated identification code, identification means for determining if the received identification code and the stored designated identification code are identical, sounding means for producing the electronic sound upon determination by said identification means that the received identification code and the stored designated identification code are identical, and display means for displaying the received message upon determination by said identification means that the received identification code and the stored identification code are identical; and a radio-paging control center for receiving a paging signal over a telephone network and transmitting the received paging signal to said radio-pager as a message, said radio-paging control center prohibiting transmission to said radio-pager of received paging signals having an identification code of a specified group of identification codes.

7. The radio-paging system of claim 6, wherein a radio paging fee together with a telephone call fee can be collected from calling parties each time the radio-paging system is used.

8. The radio-paging system of claim 6, wherein said input means comprises a symbol-numeric keyboard mounted on said radio-pager.

9. A radio-pager comprising:

demodulation means for demodulating a received paging signal into a demodulated signal, the demodulated signal including a paging identification code;

storing means for storing a pager identification code;

input means, coupled to said storing means, for entering the pager identification code into said storing means;

comparison means, coupled to said storing means and said demodulation means, for outputting a coincidence signal when the paging identification code and the pager identification code coincide; and sounding means, coupled to said comparison means and said demodulation means, for producing a sound upon receipt of the coincidence signal.

10. The radio-pager of claim 9, wherein the demodulated signal further includes a message including symbol-numeric characters, the radio pager further comprising:

display means, coupled to said comparison means and said demodulation means, for displaying the message upon receipt of the coincidence signal.

11. The radio-pager of claim 9, wherein said input means comprises a symbol-numeric keyboard mounted on the radio-pager.

12. A radio-paging system comprising:

a radio-pager including demodulation means for demodulating a received paging signal into a demodulated signal, the demodulated signal including a paging identification code, storing means for storing a pager identification code, input means, coupled to said storing means, for entering the pager identification code into said storing means, comparison means, coupled to said storing means and said demodulation means, for outputting a coincidence signal when the paging identification code and the pager identification code coincide, and sounding means coupled to said comparison means and said demodulation means, for producing a sound upon receipt of the coincidence signal; and a radio-paging control center for receiving a paging signal over a telephone network and transmitting the paging signal to said radio-pager, said radio-paging control center prohibiting transmission to said radio-pager of received paging signals having an identification code of a specified group of identification codes.

13. The radio-paging system of claim 12, wherein a radio paging fee together with a telephone call fee can be collected from calling parties each time the radio-paging system is used.

14. The radio-paging system of claim 12, wherein the demodulated signal further includes a message including symbol-numeric characters, said radio pager further comprising:

display means, coupled to said comparison means and said demodulation means, for displaying the message upon receipt of the coincidence signal.

15. The radio-paging system of claim 12, wherein said input means comprises a symbol-numeric keyboard mounted on said radio-pager.

* * * * *